US009830060B2

(12) United States Patent
Leorin et al.

(10) Patent No.: US 9,830,060 B2
(45) Date of Patent: Nov. 28, 2017

(54) MANIPULATION OF CONTENT ON A SURFACE

(71) Applicant: Microsoft Technology Licensing, LLC, Redmond, WA (US)

(72) Inventors: Simone Leorin, Redmond, WA (US); Nghiep Duy Duong, Sammamish, WA (US); Steven Wei Shaw, Bellevue, WA (US); William George Verthein, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 221 days.

(21) Appl. No.: 14/012,332

(22) Filed: Aug. 28, 2013

(65) Prior Publication Data
US 2015/0067552 A1    Mar. 5, 2015

(51) Int. Cl.
| | |
|---|---|
| *G06F 3/0488* | (2013.01) |
| *G06F 3/03* | (2006.01) |
| *G06F 3/048* | (2013.01) |
| *G06F 3/0484* | (2013.01) |
| *G06F 3/0481* | (2013.01) |

(52) U.S. Cl.
CPC ........ *G06F 3/04845* (2013.01); *G06F 3/0304* (2013.01); *G06F 3/048* (2013.01); *G06F 3/0481* (2013.01); *G06F 3/0488* (2013.01); *G06F 3/04842* (2013.01); *G09G 2340/14* (2013.01)

(58) Field of Classification Search
CPC ......... G06T 19/006; G06F 2203/04108; G06F 3/042–3/0426; G06F 3/0488; G06F 17/24–17/248; H04L 65/00–65/80; H04L 65/4076; G09G 2340/14

USPC .......................................................... 715/765
See application file for complete search history.

(56) References Cited

U.S. PATENT DOCUMENTS

| | | | |
|---|---|---|---|
| 7,224,847 B2 * | 5/2007 | Zhang ............... | H04L 29/06027 348/E7.083 |
| 7,559,037 B2 | 7/2009 | Keely, Jr. et al. | |
| 8,416,217 B1 | 4/2013 | Eriksson et al. | |
| 8,519,971 B1 * | 8/2013 | Mackraz ................. | G06F 3/147 313/504 |
| 2002/0101418 A1 | 8/2002 | Vernier et al. | |
| 2004/0070616 A1 | 4/2004 | Hildebrandt et al. | |

(Continued)

FOREIGN PATENT DOCUMENTS

| | | | | |
|---|---|---|---|---|
| JP | 2009116727 | * | 5/2009 | ............. G06F 3/048 |

OTHER PUBLICATIONS

"International Search Report and Written Opinion", Application No. PCT/US2014/052433, dated Dec. 8, 2014, 9 pages.

(Continued)

*Primary Examiner* — Jennifer To
*Assistant Examiner* — Liang Li

(57) ABSTRACT

Various embodiments enable expeditious manipulation of content on a surface so as to make the content quickly visually available to one or more attendees or participants. In at least some embodiments, content can be automatically manipulated to automatically present the content in a surface location that provides an unobstructed view of the content. Alternately or additionally, content can be manually selected to become "floating" in a manner which moves the content to a surface location that provides an unobstructed view of the content.

20 Claims, 9 Drawing Sheets

(56) References Cited

U.S. PATENT DOCUMENTS

| | | | |
|---|---|---|---|
| 2004/0196273 A1* | 10/2004 | Mitsumura et al. | 345/204 |
| 2005/0239037 A1 | 10/2005 | Lertsithichai et al. | |
| 2006/0284850 A1* | 12/2006 | Tokkonen | G06F 3/0488 345/173 |
| 2009/0051661 A1* | 2/2009 | Kraft et al. | 345/173 |
| 2010/0313143 A1* | 12/2010 | Jung | G06F 3/1446 715/753 |
| 2011/0234481 A1 | 9/2011 | Katz et al. | |
| 2011/0321143 A1* | 12/2011 | Angaluri | H04N 9/3194 726/6 |
| 2012/0139897 A1 | 6/2012 | Butler et al. | |
| 2012/0166985 A1* | 6/2012 | Friend | G06F 9/4448 715/765 |
| 2013/0055143 A1* | 2/2013 | Martin | G06F 3/0425 715/779 |
| 2014/0104139 A1* | 4/2014 | Buchner | G06F 3/1438 345/1.3 |
| 2014/0281012 A1* | 9/2014 | Troxler | H04L 67/2804 709/231 |

OTHER PUBLICATIONS

Loviscach, Jorn, "A Real-time Production Tool for Animated Hand Sketches", In Conference for Visual Media Production, Nov. 16, 2011, pp. 7.

"International Preliminary Report on Patentability", Application No. PCT/US2014/052433, dated Nov. 26, 2015, 6 pages.

"Second Written Opinion", Application No. PCT/US2014/052433, dated Sep. 2, 2015, 5 pages.

* cited by examiner

MANIPULATION OF CONTENT ON A SURFACE

BACKGROUND

Surfaces such as electronic whiteboards, interactive electronic whiteboards, and large screen touch surfaces have gained in popularity, particularly as a mechanism to be used during presentation of information in meetings, lectures, and other gatherings with large numbers of people. Typically, a person presenting information will write on the surface or otherwise make annotations which are then presented to the attendees. In many instances, however, the attendees have to wait until the presenter steps aside to reveal the content that they have placed on the surface. When the presenter obstructs the attendees' view of the content being added to the surface, such can impair the attention and/or comprehension of the attendees.

SUMMARY

This Summary is provided to introduce a selection of concepts in a simplified form that are further described below in the Detailed Description. This Summary is not intended to identify key features or essential features of the claimed subject matter.

Various embodiments enable expeditious manipulation of content on a surface so as to make the content quickly visually available to one or more attendees or participants. In at least some embodiments, content can be automatically manipulated to automatically present the content in a surface location that provides an unobstructed view of the content. Alternately or additionally, content can be manually selected to become "floating" in a manner which moves the content to a surface location that provides an unobstructed view of the content.

In further embodiments, content that is presented on a surface can be dynamically floating in a manner that adapts the content's location to perceived obstructions relative to the surface.

In other embodiments, multiple different surfaces can utilize the above-described embodiments, as well as others described below, to present content in an easily-discernible manner.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
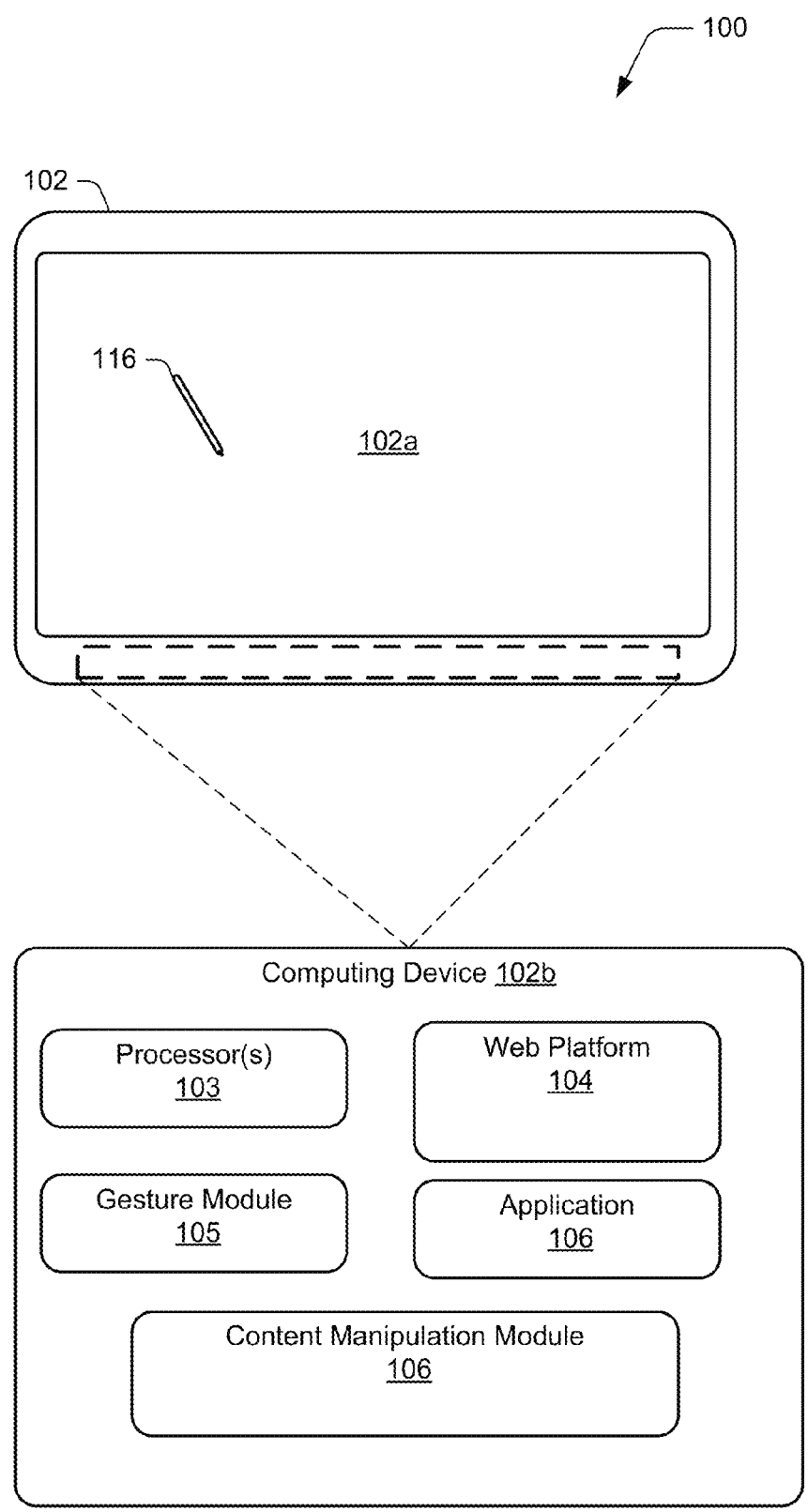
FIG. 1 is an illustration of an environment in an example implementation in accordance with one or more embodiments.

Various embodiments enable expeditious manipulation of content on a surface so as to make the content quickly visually available to one or more attendees or participants. The various embodiments described herein can be utilized in connection with any suitably-configured surface.

One example of such a surface is an electronic whiteboard. Typically, electronic whiteboards are used without a projector and enable notes, such as those that might be entered by a stylus or pen, to be saved via a computing device. The computing device can be physically connected to the electronic whiteboard or, alternately, can be integrated within the electronic whiteboard.

Another example of such a surface is an interactive whiteboard. Interactive whiteboards can be used to display a computer desktop and enable interaction, via the whiteboard, with information displayed by way of the computer desktop. Interactive whiteboards can be used to open applications, navigate websites, and write and save whiteboard notes. Interactive whiteboards can be used in an electronic whiteboard configuration, e.g., without a projector, or as an interactive whiteboard that may or may not include a projector. The computing device associated with an interactive whiteboard can be either a standalone computing device that is connected to the interactive whiteboard, or as an integrated unit that is integrated into the structure of the interactive whiteboard.

Another example of such a surface is a touchscreen, such as large multi-touch screens that can utilize any suitable type of technology such as LCD large screens and the like.

In at least some embodiments, content can be automatically manipulated to automatically present the content in a surface location that provides an unobstructed view of the content. For example, as a person operates in front of the surface to add content onto the surface, they will typically obscure at least a portion of the content that appears on the surface. In these embodiments, content that is provided onto the surface can be automatically relocated to a surface location to present an obstructed view of the content. Alternately or additionally, the surface can utilize certain cues to automatically present the content in an alternate surface location. For example, cues can be derived from the person providing the content onto the surface. So, for instance, one cue might be when the person turns around from the surface to face an audience. In this instance, when the person turns around to face the audience, the content that was provided onto the surface can be moved to a surface location to present an unobstructed view of the content.

Alternately or additionally, content can be manually selected to become "floating" in a manner which moves the content to a surface location that provides an unobstructed view of the content. For example, when content is added to the surface, the person adding the content can select the content in any suitable way, e.g., through a gesture, to then have the content moved to a surface location that provides an unobstructed view of the content. Any suitable type of gesture can be utilized, examples of which are provided below.

In further embodiments, content that is presented on a surface can be dynamically floating in a manner that adapts the content's location to perceived obstructions relative to the surface. For example, as a person provides content onto the surface, the person may walk around in front of the surface. In this case, as the person moves in front of the surface or stands in front of the surface, the content can be moved to a location that provides an unobstructed view. Thus, if the person is standing to obstruct the right side of the surface, the content can be moved to the left side of the surface. As a person moves from the right side of the surface to the left side of the surface, the content can be relocated to the right side of the surface to present an unobstructed view.

To implement these and other embodiments, various optical sensors or other optical technology can be utilized to detect and define an area of obstruction relative to the surface. This area of obstruction can then form the basis to enable content to be located to an unobstructed portion of the surface. Further, these and other embodiments can be implemented using one or more cameras that capture an image of the surface and any obstructions in front of the surface to provide a boundary-box relative to which obstructed content can be repositioned.

In other embodiments, multiple different surfaces can utilize the above-described embodiments, as well as others described below, to present content in an easily-discernible manner.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

Example Operating Environment

FIG. 1 is an illustration of an environment 100 in an example implementation that is operable to employ the techniques described in this document. The illustrated environment 100 includes an example of a surface 102 that may be configured in a variety of ways. As noted above, the surface 102 can be configured in a number of different configurations including, by way of example and not limitation, electronic whiteboards, interactive whiteboards, multi-touch screens, and the like.

The surface 102 includes a display 102a and a computing device 102b that serves as a control device for the surface. The display 102a can be utilized to receive input by way of touch, such as through a fingertip, a stylus or a pen. The computing device 102b can be a stand-alone computing device in which case it can be connected to display 102a by a video graphics array (VGA) cable. In addition, a universal serial bus (USB) cable can be connected between the computing device 102b and surface 102 for data and other information exchange. Alternately or additionally, the computing device 102b may be integrated into the surface 102.

Figure 3:
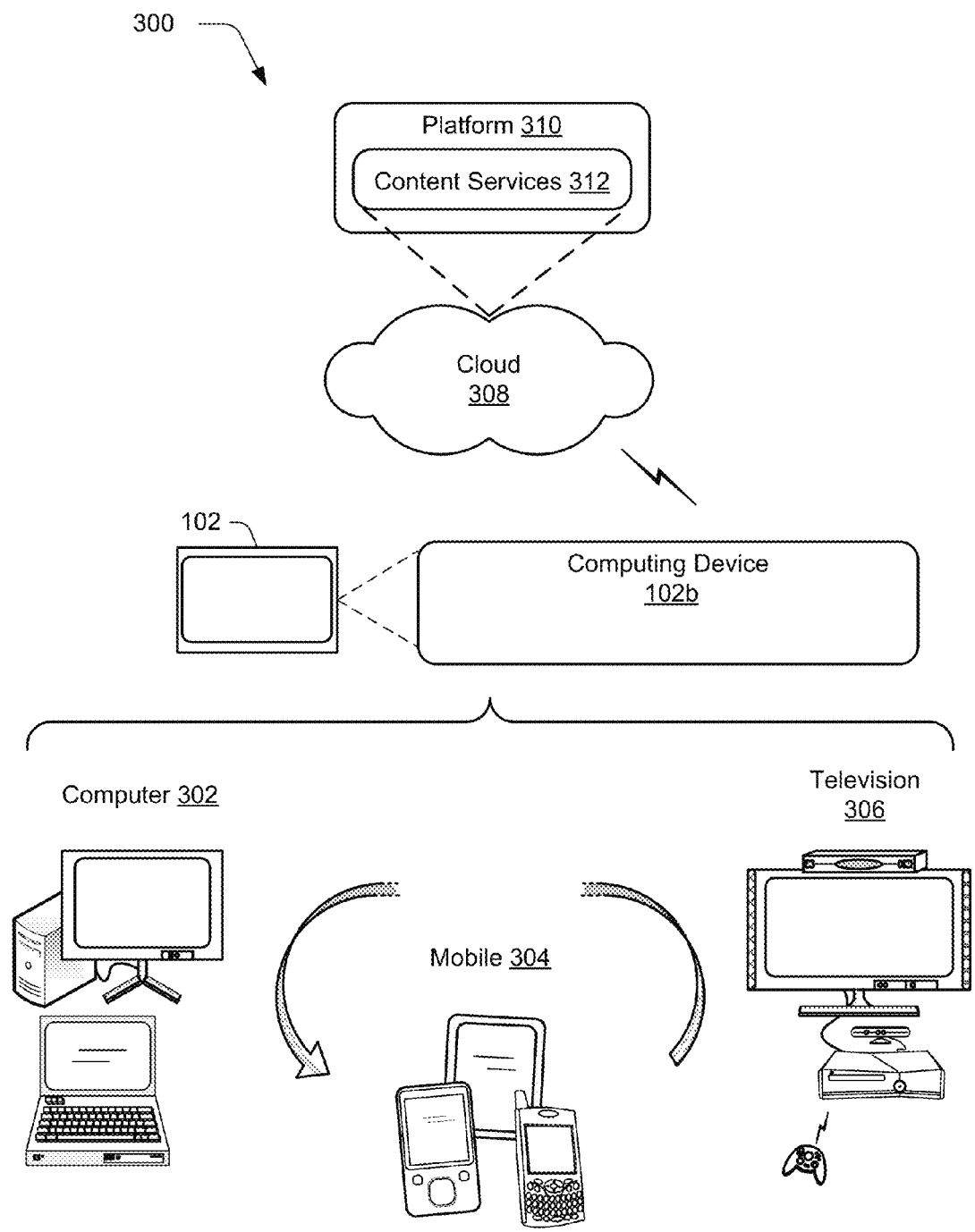
FIG. 3 is an illustration of an environment in an example implementation in accordance with one or more embodiments.

The computing device 102b may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 3. Thus, the computing device 102b may range from full resource devices with substantial memory and processor resources (e.g., personal computers, game consoles) to a low-resource device with limited memory and/or processing resources (e.g., traditional set-top boxes, hand-held game consoles). The computing device 102b also includes software that causes the computing device 102b to perform one or more operations as described below.

Computing device 102b includes one or more processors 103 and, in at least some embodiments, a web platform 104. The web platform works in connection with content of the web, e.g. public content such as web pages and the like. A web platform can include and make use of many different types of technologies such as, by way of example and not limitation, URLs, HTTP, REST, HTML, CSS, JavaScript, DOM, and the like. The web platform can also work with a variety of data formats such as XML, JSON, and the like. Web platforms can include web browsers and local applications. Content acquired by the web platform 104 can be rendered on display 102a.

Computing device 102b can also include a gesture module 105 that recognizes input pointer gestures that can be performed by one or more fingers, or other input device, and causes operations or actions to be performed that correspond to the gestures. The gestures may be recognized by module 105 in a variety of different ways. For example, the gesture module 105 may be configured to recognize a touch input, such as a finger of a user's hand as proximal to display 102a of the surface 102 using touchscreen functionality, or functionality that senses proximity of a user's finger that may not necessarily be physically touching the display, e.g., using near field technology. Module 105 can be utilized to recognize single-finger gestures and bezel gestures, multiple-finger/same-hand gestures and bezel gestures, and/or multiple-finger/different-hand gestures and bezel gestures.

Computing device 102b also includes one or more applications 106 that can be invoked to execute on the computing device and surface 102. Any suitable type of applications can be provided.

The computing device 102b may also be configured to detect and differentiate between a touch input (e.g., provided by one or more fingers of the user's hand) and a stylus or pen input (e.g., provided by a stylus or pen 116). The differentiation may be performed in a variety of ways, such as by detecting an amount of the display that is contacted by the finger of the user's hand versus an amount of the display that is contacted by the stylus 116.

Thus, the gesture module 105 may support a variety of different gesture techniques through recognition and leverage of a division between stylus and touch inputs, as well as different types of touch inputs and non-touch inputs.

Computing device 102b can also include a content manipulation module 106 that operates as described above and below. Specifically, the content manipulation module 106 can enable expeditious manipulation of content that appears on surface 102 so as to make the content quickly visually available to one or more attendees or participants. In at least some embodiments, the content manipulation module 106 can automatically manipulate content to automatically present the content in a surface location that provides an unobstructed view of the content, e.g., to the right or left of a user writing on surface 102. Alternately or additionally, the content manipulation module 106 can enable selected content (e.g., content manually selected by a gesture recognized by gesture module 105) to become "floating" in a manner which moves the content to a surface location that provides an unobstructed view of the content.

In further embodiments, the content manipulation module 106 can enable content that is presented on the surface 102 to dynamically float in a manner that adapts the content's location to perceived obstructions relative to the surface 102.

In other embodiments, multiple different surfaces can utilize the above-described embodiments, as well as others described below, to present content in an easily-discernible manner.

Figure 2:
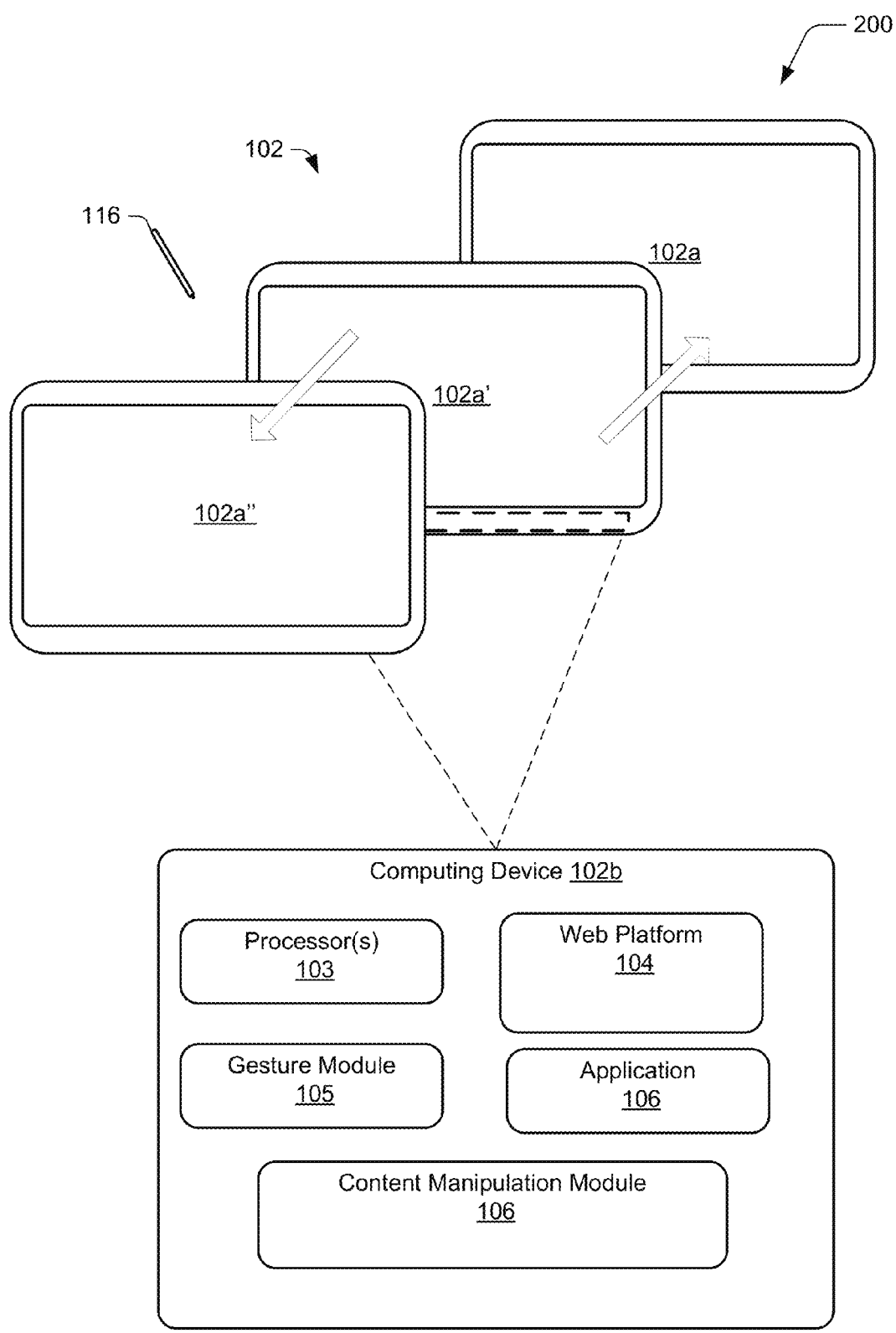
FIG. 2 is an illustration of an environment in an example implementation in accordance with one or more embodiments.

Consider now FIG. 2 which shows an example environment 200 in accordance with one or more embodiments. In this example, like numerals from the FIG. 1 description have been utilized to depict like components. In the illustrated and described embodiment, surface 102 includes multiple different surfaces to provide respective displays 102a, 102a', and 102a". Content can be manipulated by content manipulation module 106 to move the content between the multiple different surfaces, as indicated by the arrows.

Surface 102 can be implemented using any suitable type of technology and/or operation such as, by way of example and not limitation, infrared scan technology, resistive, touch-based technology, electromagnetic pen-technology, and ultrasonic-based technology. Further technologies can include, by way of example and not limitation, capacitive, resistive, active/passive electromagnetic, optical (e.g., laser light curtain, frustrated total internal reflection, camera pen), dispersive signal technology, and the like. The principles of operation of these types of technologies are generally known and, for the sake of brevity, are not described herein.

FIG. 3 illustrates an example system 300 that includes the computing device 102b as described with reference to FIGS. 1 and 2. The example system 300 enables ubiquitous environments for a seamless user experience when running applications on a personal computer (PC), a television device, and/or a mobile device in conjunction with a surface 102. Services and applications run substantially similar in all three environments for a common user experience when transitioning from one device to the next while utilizing an application, playing a video game, watching a video, and so on.

In the example system 300, multiple devices are interconnected through a central computing device 102b and can interact with and exchange data with surface 102. The central computing device may be local to the multiple devices or may be located remotely from the multiple devices. These computers can be connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing devices may assume a variety of different configurations, such as for computer 302, mobile 304, and television 306 uses. Each of these configurations includes devices that may have generally different constructs and capabilities, and thus the computing devices may be configured according to one or more of the different device classes. For instance, the computing device may be implemented as the computer 302 class of a device that includes a personal computer, desktop computer, a multi-screen computer, laptop computer, netbook, and so on. Each of these different configurations may employ a web platform, e.g. a web browser, as described above and below.

The computing device 302 may also be implemented as the mobile 304 class of device that includes mobile devices, such as a mobile phone, portable music player, portable gaming device, a tablet computer, a multi-screen computer, and so on. The computing device 302 may also be implemented as the television 306 class of device that includes devices having or connected to generally larger screens in casual viewing environments. These devices include televisions, set-top boxes, gaming consoles, and so on. The techniques described herein may be supported by these various configurations of the computing device and are not limited to the specific examples the techniques described herein.

The cloud 308 includes and/or is representative of a platform 310 for content services 312. The platform 310 abstracts underlying functionality of hardware (e.g., servers) and software resources of the cloud 308. The content services 312 may include applications and/or data that can be utilized while computer processing is executed on servers that are remote from the computing devices. Content services 312 can be provided as a service over the Internet and/or through a subscriber network, such as a cellular or Wi-Fi network.

The platform 310 may abstract resources and functions to connect the computing devices with other computing devices. The platform 310 may also serve to abstract scaling of resources to provide a corresponding level of scale to encountered demand for the content services 312 that are implemented via the platform 310. Accordingly, in an interconnected device embodiment, implementation of functionality described herein may be distributed throughout the system 300. For example, the functionality may be implemented in part on the computing device as well as via the platform 310 that abstracts the functionality of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe various example embodiments. A section entitled "Example Content Manipulation Module" describes a content manipulation module in accordance with one or more embodiments. Following this, a section entitled "Automatically Arranging Content" describes how content can be automatically arranged in accordance with one or more embodiments. Next, a section entitled "Manually Arranging Content" describes how content can be manually arranged in accordance with one or more embodiments. Next, a section entitled "Implementation Details and Use Examples" describes aspects of an implementation and provides examples of how the inventive embodiments can be used.

Last, a section entitled "Example Device" describes aspects of an example device that can be utilized to implement one or more embodiments.

Having described example operating environments in which the inventive principles can be employed, consider now a discussion of various embodiments.

Example Content Manipulation Module

Figure 4:
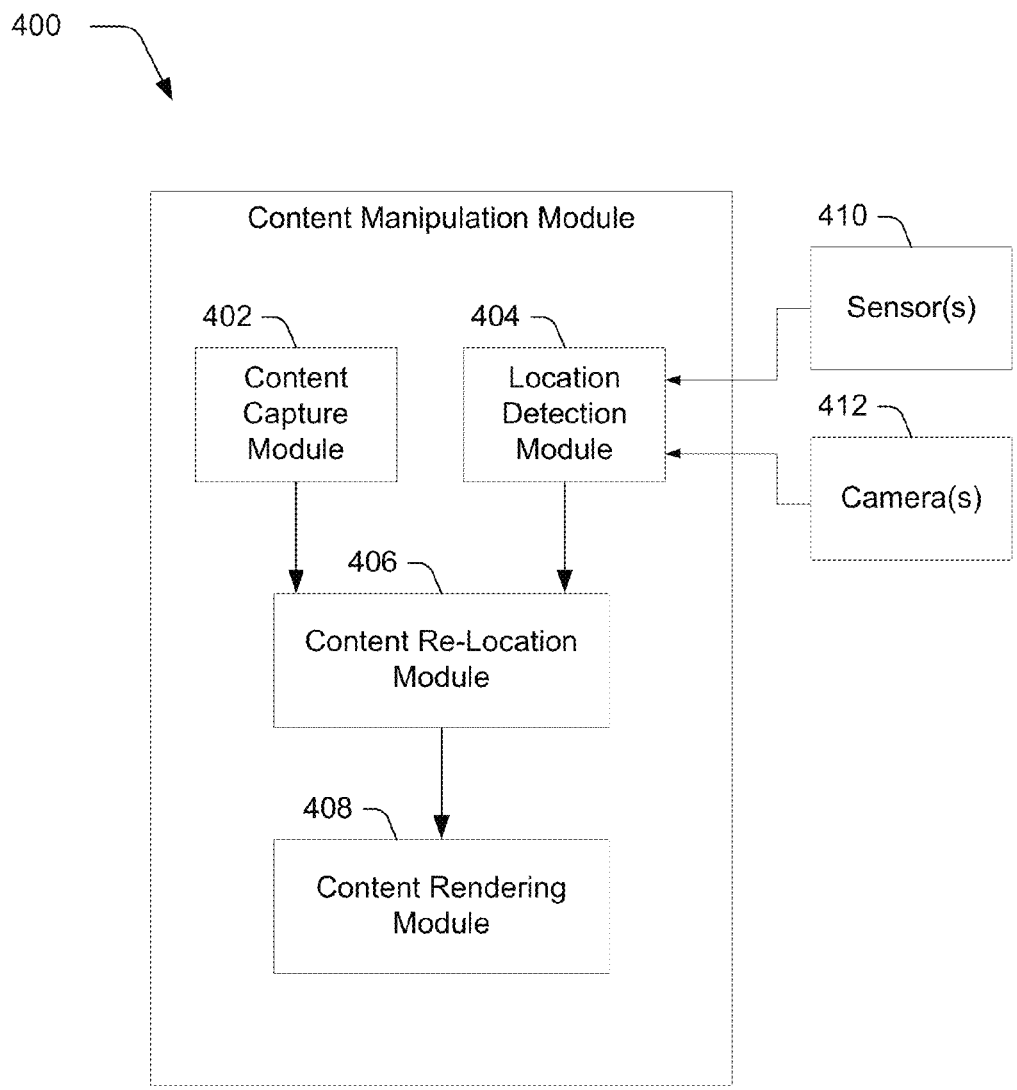
FIG. 4 illustrates an example content manipulation module in accordance with one or more embodiments.

FIG. 4 illustrates an example content manipulation module in accordance with one or more embodiments generally at 400. The content manipulation module can be implemented in connection with any suitable hardware, software, firmware, or combination thereof. In at least some embodiments, the content manipulation module is implemented in software that resides on some form of computer readable storage medium.

In the illustrated and described example, the content manipulation module includes or otherwise makes use of a content capture module 402, a location detection module 404, a content relocation module 406, and a content rendering module 408. In at least some embodiments, the content manipulation module can include or otherwise make use of one or more sensors 410 and/or one or more cameras 412.

In operation, content capture module 402 captures content that is placed on or otherwise appears on a surface such as surface 102 (FIG. 1). For example, as a user writes on the surface the content capture module can capture the writing and save it to a suitably-configured buffer. Content can be saved in any suitable format including, by way of example and not limitation, uncompressed format, e.g., bitmap) and a compressed format (e.g., TIFF, JPEG, etc.). Content other than or in addition to a user's writing can be captured and processed as described herein. This content can include, by way of example and not limitation, images, video, web content, and the like. The content capture module can also save the location or coordinates of the content that it captures.

Location detection module 404 is configured to ascertain the location and "footprint" of an obstruction close to the surface 102. Typically, the obstruction resides in the form of a user who is adding content to the surface 102, e.g., by writing on the surface. Any suitable type of location detection techniques can be utilized by the location detection module 404. In at least some embodiments, one or more sensors 410 can be utilized to ascertain the location or footprint of an obstruction. Any suitable type of sensors can be utilized. For example, in embodiments where the surface 102 resides as an LCD surface, sensors can be embedded among the LCD pixels to detect obstructions. Alternately or additionally, sensors can be embedded around the periphery of the surface 102 to detect obstructions. Example sensors that can be utilized include, by way of example and not limitation, any suitable type of proximity sensor including, by way of example and not limitation, photocells, infrared sensors, capacitive sensors, inductive sensors, laser rangefinders, magnetic sensors, passive optical sensors, passive thermal sensors, sonar, ultrasonic sensors, and the like. In at least some embodiments, one or more cameras 412 can be utilized to ascertain the location and footprint of an obstruction. The camera or cameras can be positioned at any suitable location relative to the surface 102. The camera or cameras can be used in place of or in addition to sensors 410.

Content re-location module 406 is configured to receive input from the content capture module 402 and the location detection module 404. By knowing the location of the content that has been captured as well as the location of the obstruction and its associated footprint, the content re-location module 406 can compute or otherwise ascertain a location that is unobstructed by the obstruction. For example, the content re-location module may utilize a grid-type system that maps to the surface. Once the content re-location module 406 computes the grid coordinates of the obstruction, it can ascertain grid coordinates that are unobstructed. After ascertaining the unobstructed grid coordinates, the content rendering module 408 can relocate the content or otherwise cause it to be rendered at the unobstructed grid coordinates. Alternately or additionally, the content-relocation module 406 can utilize a boundary box that is set to a preset size so that relocated content snaps to a constrained position in a predictable manner.

Having described an example content manipulation module in accordance with one or more embodiments, consider now various implementations that can utilize the content manipulation module.

Automatically Arranging Content

Figure 5:
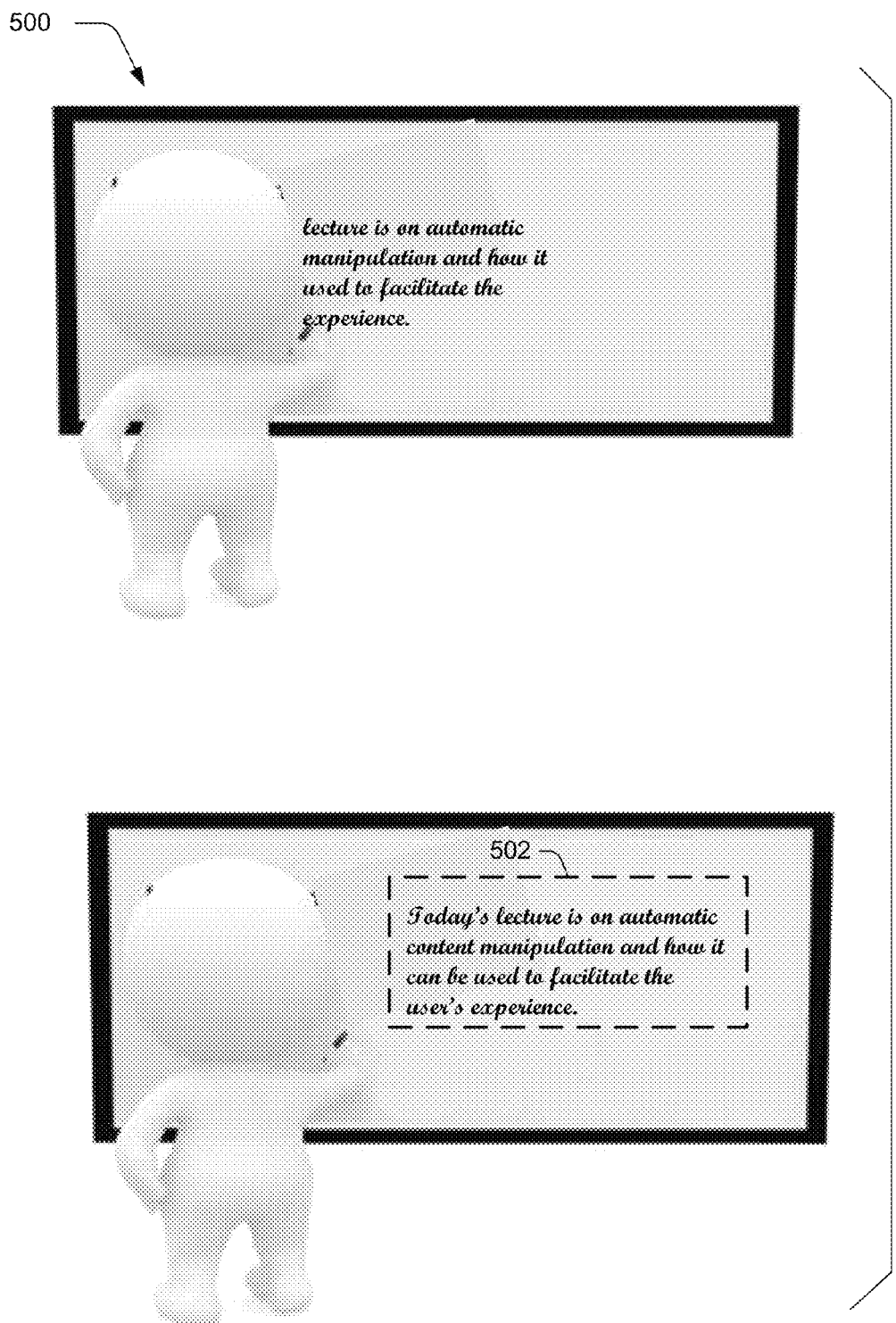
FIG. 5 illustrates an example surface in accordance with one or more embodiments.

Various embodiments enable expeditious manipulation of content on a surface so as to make the content quickly visually available to one or more attendees or participants. As an example, consider FIG. 5 which illustrates an example surface, generally at 500, in two different states. In the topmost figure, a user appears in front of the surface and is writing content onto the surface. Notice that a portion of the content is obstructed because of the user. In at least some embodiments, and as shown in the bottommost figure, content can be automatically manipulated and presented in a surface location, indicated by the dashed line 502, that provides an unobstructed view of the content. The dashed line 502 indicates a boundary box that can be a predefined or preset size.

Any suitable techniques can be utilized to ascertain an amount of content that is to be re-located. For example, a predefined or a definable text threshold amount can be set. When the text threshold is reached, as soon as the user returns to the next line to continue writing, the text can be moved to its new unobstructed surface location. Alternately or additionally, text can be moved each time the user returns to a new line to continue writing.

Alternately or additionally, the surface can utilize certain cues to automatically present the content in an alternate surface location. For example, cues can be derived from the person providing the content onto the surface. So, for instance, one cue might be when the person turns around from the surface to face an audience. The location detection module 404 can ascertain, by virtue of the input that it receives, that the person has turned around. Responsive to ascertaining that the person has turned around to face the audience, the content re-location module 406 can cause the content to be relocated and rendered in the alternate surface location.

In addition, in various embodiments, content provided onto the surface can be provided to remote computing devices. In these instances, a ghost outline of the person adding the content to the surface can be superimposed over the content at the remote computing devices. This can provide the remote user with context associated with the person providing the content. In these embodiments, the content may not necessarily relocate in a corresponding manner on the remote user's computing device.

Figure 6:
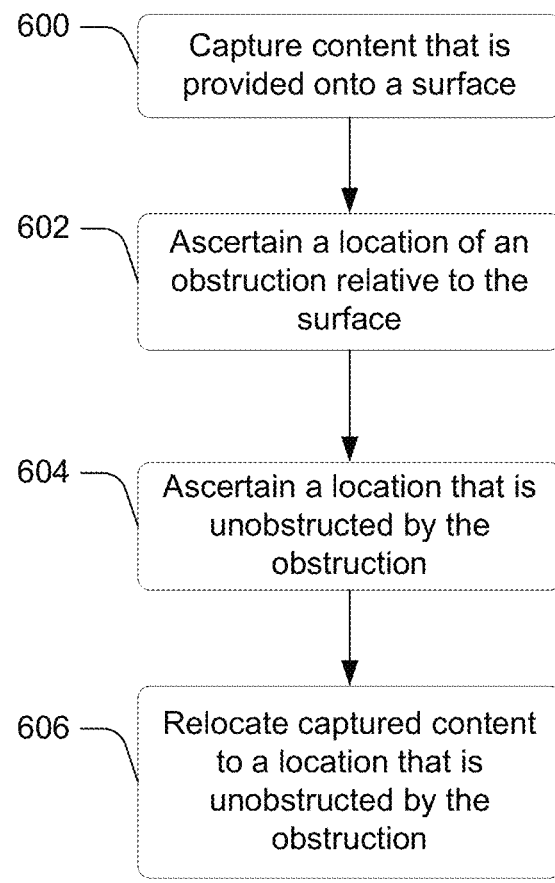
FIG. 6 is a flow diagram that describes steps in a method in accordance with one or more embodiments.

FIG. 6 is a flow diagram that describes steps in a method in accordance with one or more embodiments. The method can be implemented in connection with any suitable hardware, software, firmware, or combination thereof. In at least some embodiments, the method can be implemented by suitably-configured software, such as the content manipulation module, executing as part of a surface, such as the surfaces described above.

Step 600 captures content that is provided onto a surface. The content can comprise any suitable type of content such as, by way of example and not limitation, text that is provided onto the surface by a user. Step 602 ascertains a location of an obstruction relative to the surface. This step can be performed in any suitable way. In at least some embodiments, sensors and/or cameras can be utilized to ascertain the location of an individual whose providing content onto the surface. Step 604 ascertains a location that is unobstructed by the obstruction. This step can be performed in any suitable way. For example, in at least some embodiments the location can be ascertained as a predefined or predetermined location. Alternately or additionally, the location can be computed on the fly and/or as the user moves around. Step 606 relocates the captured content to the location that is unobstructed by the obstruction. This step can be performed in any suitable way. For example, in at least some embodiments, steps 600-606 can be performed in an iterative fashion as a user moves in front of the surface. In this manner, the content can automatically "float" around the user to unobstructed locations.

Manually Arranging Content

Figure 7:
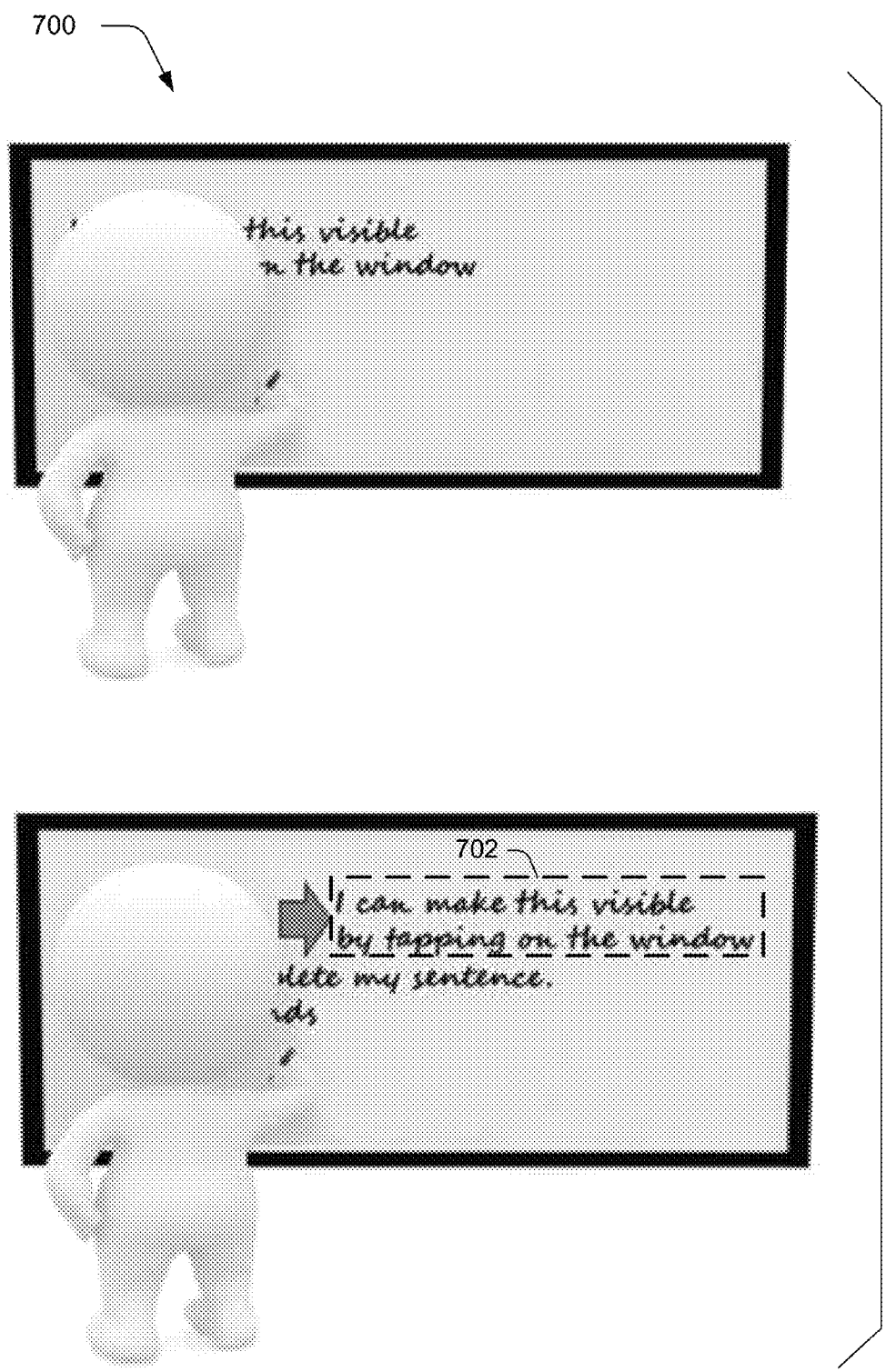
FIG. 7 illustrates an example surface in accordance with one or more embodiments.

Alternately or additionally, content can be manually selected to become "floating" in a manner which moves the content to a surface location that provides an unobstructed view of the content. For example, when content is added to the surface, the person adding the content can select the content in any suitable way, e.g., through a gesture, to then have the content moved to a surface location that provides an unobstructed view of the content. Any suitable type of gesture can be utilized, examples of which are provided below. As an example, consider FIG. 7 which illustrates an example surface, generally at 700, in two different states. In the topmost figure, a user appears in front of the surface and is writing content onto the surface. Notice that a portion of the content is obstructed because of the user. In at least some embodiments, and as shown in the bottommost figure, content can be selected by a user, as through a suitable gesture such as a tap, double tap, or through a natural user interface in which the gesture is not touch-based. The selected content can be presented in a surface location, indicated by the dashed line 702, that provides an unobstructed view of the content.

Any suitable techniques can be utilized to ascertain an amount of content that is to be re-located. For example, the user may designate text by a single tap above and below the text that is to be selected, followed with a double tap to cause the text to be relocated. Alternately or additionally, the user may select the text by gesturing an arc or a bracket around the text followed by a single tap or double tap to cause the text to be relocated. In the context of a natural user interface that is not touch-based, the gesture may include a double-squeeze gesture to select the text, followed by a right or left sweep movement to cause the text to relocate to the right or left, respectively, of the user.

In further embodiments, content that is presented on a surface can be dynamically floating in a manner that adapts the content's location to perceived obstructions relative to the surface. For example, as a person provides content onto the surface and provides a gesture to indicate that the content is to float, the person may walk around in front of the surface. In this case, as the person moves in front of the surface or stands in front of the surface, the content can be moved to a location that provides an unobstructed view. Thus, if the person is standing to obstruct the right side of the surface, the content can be moved to the left side of the surface. As a person moves from the right side of the surface to the left side of the surface, the content can be relocated to the right side of the surface to present an unobstructed view.

In addition, in various embodiments, content provided onto the surface can be provided to remote computing devices. In these instances, a ghost outline of the person adding the content to the surface can be superimposed over the content at the remote computing devices. This can provide the remote user with context associated with the person providing the content. In these embodiments, the content may not necessarily relocate in a corresponding manner on the remote user's computing device.

Figure 8:
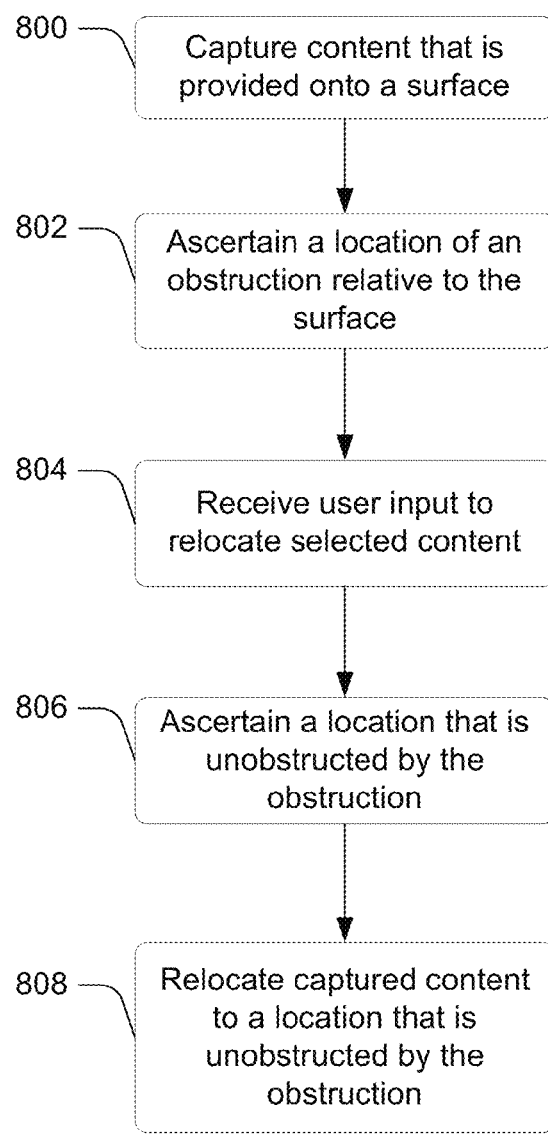
FIG. 8 is a flow diagram that describes steps in a method in accordance with one or more embodiments.

FIG. 8 is a flow diagram that describes steps in a method in accordance with one or more embodiments. The method can be implemented in connection with any suitable hardware, software, firmware, or combination thereof. In at least some embodiments, the method can be implemented by suitably-configured software, such as the content manipulation module, executing as part of a surface, such as the surfaces described above.

Step 800 captures content that is provided onto a surface. The content can comprise any suitable type of content such as, by way of example and not limitation, text that is provided onto the surface by a user. Step 802 ascertains a location of an obstruction relative to the surface. This step can be performed in any suitable way. In at least some embodiments, sensors and/or cameras can be utilized to ascertain the location of an individual who is providing content onto the surface. Step 804 ascertains a location that is unobstructed by the obstruction. This step can be performed in any suitable way. For example, in at least some embodiments the location can be ascertained as a predefined or predetermined location. Alternately or additionally, the location can be computed on the fly and/or as the user moves around. Step 804 receives user input to relocate selected content. This step can be performed in any suitable way. For example, this step can be performed through the use of one or more gestures, examples of which are provided above. Step 806 ascertains a location that is unobstructed by the obstruction. This step can be performed in any suitable way. For example, the unobstructed location may be a pre-defined boundary box such as the ones discussed above. Alternately or additionally, the unobstructed location may simply be a location that is unobstructed and determined to be so in a dynamic fashion. Step 808 relocates the captured content to the location that is unobstructed by the obstruction. This step can be performed in any suitable way. For example, in at least some embodiments, steps 800-808 can be performed in an iterative fashion as a user moves in front of the surface. In this manner, the content can automatically "float" around the user to unobstructed locations.

Implementation Details and Use Examples

In one implementation, text and other content can be added to a surface in a container or window that has various properties. One of the container properties is a "floating" mode. The floating mode can be based on a simple heuristic that takes into account the available space on a surface to which to relocate content. Alternately or additionally, the floating mode can be based on a predetermined content shift to one side of the surface or the other in order to make content viewable to an audience. As noted above, various types of content other than or in addition to text, can be processed as described in this document. For example, in the context of the container mentioned above, different container types can be defined for different content types.

Container types can include, by way of example and not limitation, text containers, graph containers, video containers, shared content containers, image containers, and the like. These various types of containers can be relocated, as described above, to maintain the visibility of their associated content.

Consider now a couple use examples that describe how the inventive embodiments can be employed.

Consider a corporate environment in which a meeting is being held in a large conference room with multiple different surfaces configured as described above. A presenter at the surface wishes to show multiple different types of content including pictures, text, graphs, and so on. During their presentation, the presenter wishes to keep working on the content in an interactive manner. The presenter may make some notes or annotations on a graph, select the graph, and cause the graph to be relocated to a location that can be viewed by their audience. Alternately, the graph may automatically relocate itself, as described above, so that it can be viewed by the audience.

Consider now a college lecture hall configured with multiple different surfaces as described above. A college chemistry professor writes down a number of different chemical formulas that serve as the basis of the lecture. As she writes each chemical formula into its text container, the text container is either automatically relocated or manually relocated to an unobstructed location so that the students can copy down the formulas.

Having considered various embodiments, consider now an example device that can be utilized to implement the various embodiments described above.

Example Device

Figure 9:
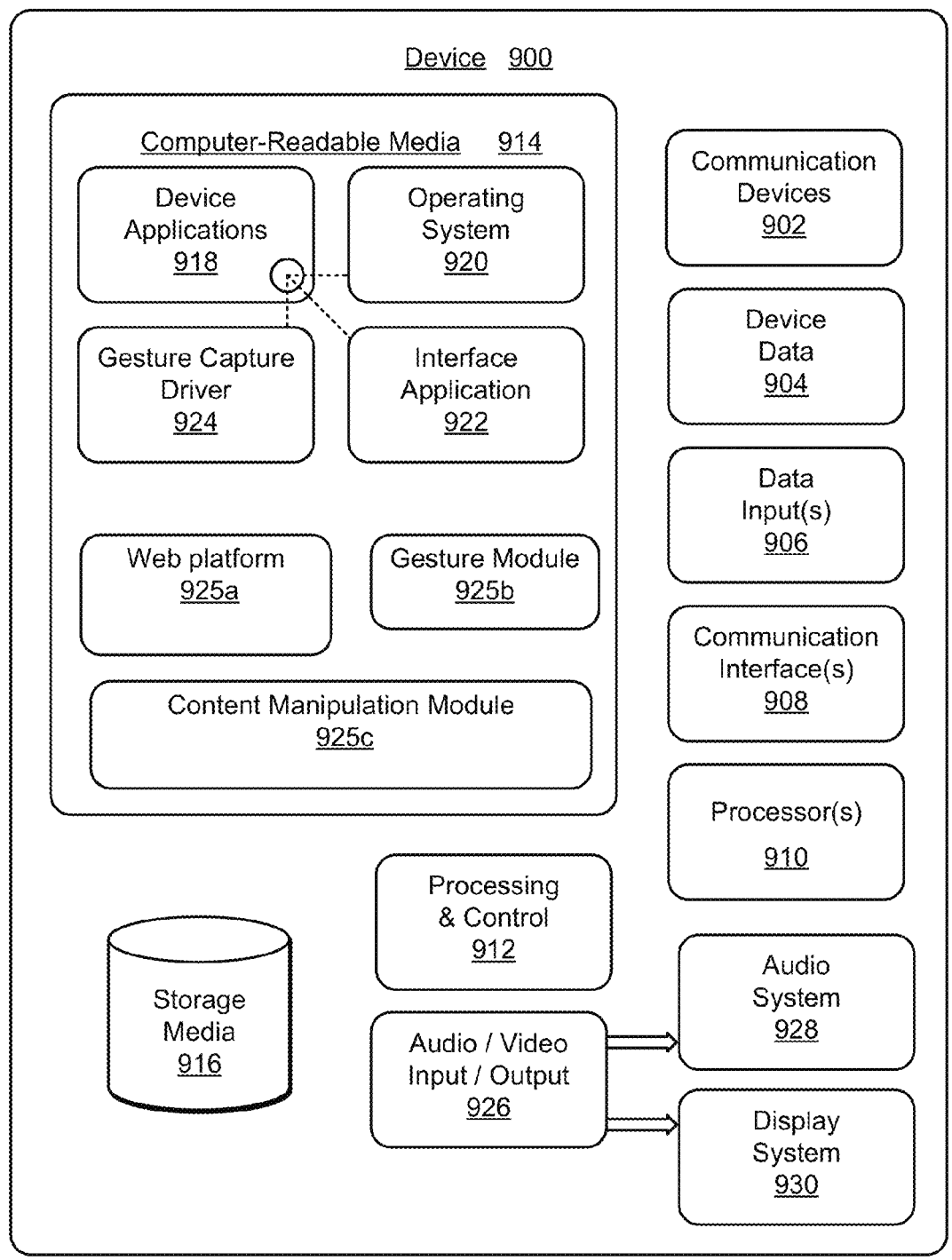
FIG. 9 illustrates an example computing device that can be utilized to implement various embodiments described herein.

FIG. 9 illustrates various components of an example device 900 that can be implemented as any type of portable and/or computer device as described with reference to FIGS. 1-3 to implement embodiments described herein. Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908 that can be implemented as any one or more of a serial and/or parallel interface, a wireless interface, any type of network interface, a modem, and as any other type of communication interface. The communication interfaces 908 provide a connection and/or communication links between device 900, surface 102 (FIG. 1) and a communication network by which other electronic, computing, and communication devices communicate data with device 900.

Device 900 includes one or more processors 910 (e.g., any of microprocessors, controllers, and the like) which process various computer-executable or readable instructions to control the operation of device 900 and to implement the embodiments described above. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable media 914 provides data storage mechanisms to store the device data 904, as well as various device applications 918 and any other types of information and/or data related to operational aspects of device 900. For example, an operating system 920 can be maintained as a computer application with the computer-readable media 914 and executed on processors 910. The device applications 918 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 918 also include any system components or modules to implement embodiments of the techniques described herein. In this example, the device applications 918 include an interface application 922 and a gesture-capture driver 924 that are shown as software modules and/or computer applications. The gesture-capture driver 924 is representative of software that is used to provide an interface with a device configured to capture a gesture, such as a touchscreen, track pad, camera, and so on. Alternatively or in addition, the interface application 922 and the gesture-capture driver 924 can be implemented as hardware, software, firmware, or any combination thereof. In addition, computer readable media 914 can include a web platform 925a, a gesture module 925b, and content manipulation module 925c that functions as described above.

Device 900 also includes an audio and/or video input-output system 926 that provides audio data to an audio system 928 and/or provides video data to a display system 930. The audio system 928 and/or the display system 930 can include any devices that process, display, and/or otherwise render audio, video, and image data. Video signals and audio signals can be communicated from device 900 to an audio device and/or to a display device via an RF (radio frequency) link, S-video link, composite video link, component video link, DVI (digital video interface), analog audio connection, or other similar communication link. In an embodiment, the audio system 928 and/or the display system 930 are implemented as external components to device 900. Alternatively, the audio system 928 and/or the display system 930 are implemented as integrated components of example device 900.

Conclusion

Various embodiments enable expeditious manipulation of content on a surface so as to make the content quickly visually available to one or more attendees or participants. In at least some embodiments, content can be automatically manipulated to automatically present the content in a surface location that provides an unobstructed view of the content. Alternately or additionally, content can be manually selected to become "floating" in a manner which moves the content to a surface location that provides an unobstructed view of the content.

In further embodiments, content that is presented on a surface can be dynamically floating in a manner that adapts the content's location to perceived obstructions relative to the surface.

In other embodiments, multiple different surfaces can utilize the above-described embodiments, as well as others described below, to present content in an easily-discernible manner.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
   capturing user input of content that is provided onto a surface;
   ascertaining a location of an obstruction relative to the surface;
   ascertaining a location that is unobstructed by the obstruction by automatically computing the location that is unobstructed as the obstruction moves relative to the surface;
   determining when an amount of content of the captured content has reached a predefined threshold; and
   responsive to determining the amount of content of the captured content has reached the predefined threshold, automatically relocating captured content to the location that is unobstructed by the obstruction.

2. The computer-implemented method of claim 1, wherein the content comprises text.

3. The computer-implemented method of claim 1, wherein said ascertaining the location of the obstruction or said ascertaining the location that is unobstructed is performed using one or more sensors comprising part of the surface.

4. The computer-implemented method of claim 1, wherein said ascertaining the location of the obstruction or said ascertaining the location that is unobstructed is performed using one or more cameras.

5. The computer-implemented method of claim 1, wherein a shape associated with the obstruction comprises a form of a person.

6. The computer-implemented method of claim 1 further comprising:
   communicating the content for receipt by a remote computing device without configuring the content to be relocated on a display associated with the remote computing device.

7. The computer-implemented method of claim 1, wherein said automatically relocating the captured content further comprises relocating the captured content by snapping the captured content to a constrained position associated with the location that is unobstructed.

8. The computer-implemented method of claim 7, wherein said snapping the captured content further comprises snapping the captured content to a boundary box that has a preset size.

9. One or more computer readable storage memories storing processor-executable instructions which, responsive to execution by at least one processor, implement a content manipulation module configured to perform operations comprising:
   capturing user input of content that is provided on an interactive surface or multitouch screen;
   ascertaining a location of an obstruction relative to the interactive surface or multitouch screen;
   ascertaining a location that is unobstructed by the obstruction by automatically computing the location that is unobstructed as the obstruction moves relative to the interactive surface or multitouch screen;
   determining when an amount of content of the captured content has reached a predefined threshold; and
   responsive to determining the amount of content of the captured content has reached the predefined threshold, automatically relocating the captured content to the location that is unobstructed by the obstruction.

10. The one or more computer readable storage memories of claim 9, wherein the content comprises text.

11. The one or more computer readable storage memories of claim 9, wherein the content comprises content other than text.

12. The one or more computer readable storage memories of claim 9, wherein ascertaining the location of the obstruction further comprises utilizing one or more sensors operably coupled to the content manipulation module and configured to detect obstructions.

13. The one or more computer readable storage memories of claim 9, wherein ascertaining the location of the obstruction further comprises utilizing one or more cameras operably coupled to content manipulation module and configured to detect obstructions.

14. The one or more computer readable storage memories of claim 9, wherein a shape associated with the obstruction comprises a form of a person.

15. The one or more computer readable storage memories of claim 9, further comprising:
   based on relocating the captured content to the location that is unobstructed by the obstruction, detecting the obstruction has moved in front of the relocated captured content; and
   visually floating the relocated captured content around the obstruction to another location, relative to the interactive surface or multitouch screen, that is unobstructed.

16. A system comprising:
   one or more surfaces configured to receive input from a user; and
   a computing device configured to be coupled to the one or more surfaces and configured to perform operations comprising:
   capturing content that is input by a user onto the one or more surfaces;
   ascertaining a location of a person relative to the one or more surfaces;
   ascertaining a location on the one or more surfaces that is unobstructed by the person by automatically computing the location that is unobstructed by the person as the person moves relative to the surface;
   determining when an amount of content of the captured content has reached a predefined threshold; and responsive to determining the amount of content of the captured content has reached the predefined threshold, automatically relocating the captured content to the location that is unobstructed by the person.

17. The system of claim 16, wherein said ascertaining the location of the person relative to the one or more surfaces further comprises computing grid coordinates of the location of the person that maps to the one or more surfaces.

18. The system of claim 16, wherein said automatically relocating the captured content further comprises relocating the captured content by snapping the captured content to a constrained position associated with the location that is unobstructed by the person.

19. A system comprising:
   one or more processors; and
   one or more computer-readable storage memories storing processor-executable instructions which, responsive to execution by the one or more processors, cause the system to perform operations including:
   capturing user input of content that is provided onto a surface;
   ascertaining a location of an obstruction relative to the surface;
   ascertaining a location that is unobstructed by the obstruction by automatically computing the location that is unobstructed as the obstruction moves relative to the surface;
   determining when an amount of content of the captured content has reached a predefined threshold; and
   responsive to determining the amount of content of the captured content has reached the predefined threshold, automatically relocating captured content to the location that is unobstructed by the obstruction.

20. The system of claim 19, wherein the surface comprises one or more of an interactive surface or multitouch screen.

* * * * *